(12) United States Patent
Bodum

(10) Patent No.: US 9,108,773 B2
(45) Date of Patent: Aug. 18, 2015

(54) CONTAINER CLOSURE

(75) Inventor: Jørgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 29 days.

(21) Appl. No.: 14/005,080

(22) PCT Filed: Feb. 24, 2012

(86) PCT No.: PCT/CH2012/000047
§ 371 (c)(1),
(2), (4) Date: Sep. 13, 2013

(87) PCT Pub. No.: WO2012/129712
PCT Pub. Date: Oct. 4, 2012

(65) Prior Publication Data
US 2014/0001208 A1    Jan. 2, 2014

(30) Foreign Application Priority Data
Mar. 29, 2011  (CH) ........................................ 572/11

(51) Int. Cl.
| | | |
|---|---|---|
| B05C 11/10 | (2006.01) | |
| B65D 47/24 | (2006.01) | |
| A47J 31/44 | (2006.01) | |
| A47J 36/14 | (2006.01) | |

(52) U.S. Cl.
CPC ........... *B65D 47/241* (2013.01); *A47J 31/4407* (2013.01); *A47J 36/14* (2013.01)

(58) Field of Classification Search
USPC ................ 222/153.14, 472, 509, 518, 153.13
See application file for complete search history.

(56) References Cited

U.S. PATENT DOCUMENTS

| | | | | |
|---|---|---|---|---|
| 2,693,716 A | * | 11/1954 | Ludwig | ........................... 74/512 |
| 2,714,476 A | * | 8/1955 | Locke | ........................... 222/508 |
| 2,801,027 A | * | 7/1957 | Locke | ............................... 222/74 |
| 4,746,036 A | * | 5/1988 | Messner | ....................... 222/484 |

(Continued)

FOREIGN PATENT DOCUMENTS

| | | |
|---|---|---|
| DE | 33 42 356 A1 | 5/1985 |
| DE | 295 04 343 U1 | 8/1996 |

(Continued)

OTHER PUBLICATIONS

International Preliminary Report on Patentability and Written Opinion issued in corresponding PCT/CH2012/000047 dated Oct. 10, 2013.

*Primary Examiner* — Donnell Long
(74) *Attorney, Agent, or Firm* — Sughrue Mion, PLLC

(57) ABSTRACT

The invention discloses a container closure (3) for closing a vessel (2). The container closure (3) has a pouring opening (37) for pouring a liquid out of the vessel (2), a closure body (36) by means of which the pouring opening (37) can be closed, and also a closure lever (33) which interacts with the closure body (36). By being pressed by a finger of the user, the closure lever (33) can be pivoted from a closure position, in which the closure body (36) closes the pouring opening (37), to an opening position, in which the closure body (36) unblocks the pouring opening (37). The container closure (3) also has a rotary element (31) which can be rotated about a vertical axis relative to the closure lever (33) in order to form a stop with the closure lever (33) in a blocking position and thereby to block the closure lever (33) in its opening position and to allow the closure lever (33) to pivot between the closure position and the opening position in a release position.

14 Claims, 3 Drawing Sheets

(56) References Cited

U.S. PATENT DOCUMENTS

| | | | |
|---|---|---|---|
| 4,752,018 A * | 6/1988 | Rudick et al. | 222/1 |
| 5,622,284 A * | 4/1997 | Sawicki | 222/153.14 |
| 5,947,343 A | 9/1999 | Horstmann | |
| 6,036,170 A * | 3/2000 | Pitocco | 251/99 |
| 6,935,536 B2 * | 8/2005 | Tardif | 222/153.14 |
| 2003/0226859 A1 | 12/2003 | Takagawa | |
| 2004/0108336 A1 | 6/2004 | Tardif | |
| 2008/0029554 A1 * | 2/2008 | Faure et al. | 222/472 |
| 2011/0146496 A1 * | 6/2011 | Bodum | 99/275 |
| 2012/0216682 A1 * | 8/2012 | Bodum | 99/297 |

FOREIGN PATENT DOCUMENTS

| | | |
|---|---|---|
| WO | 2009/149568 A2 | 12/2009 |
| WO | 2010/003258 A1 | 1/2010 |
| WO | 2010/031198 A2 | 3/2010 |

* cited by examiner

CONTAINER CLOSURE

CROSS REFERENCE TO RELATED APPLICATIONS

This application is a National Stage of International Application No. PCT/CH2012/000047 filed Feb. 24, 2012, claiming priority based on Swiss Patent Application No. 00572/11 filed Mar. 29, 2011, the contents of all of which are incorporated herein by reference in their entirety.

TECHNICAL FIELD

The present invention relates to a container closure for closing a vessel. The closure has a pouring opening which is closable via a closure lever having a closure body, said closure lever being operable in a vertical direction.

PRIOR ART

Document WO 2009/149568 discloses a beverage container in the form of what is known as a "French press". For the preparation of, for example, coffee or tea in this beverage maker, a filter piston is inserted into the vessel and pressed down such that a plunger filter separates the prepared beverage from the depleted coffee powder or the tea leaves. In order to reduce the risk of the user being scalded by hot liquid spurting out when pressing down the filter piston, a closure in which a pouring opening is closable by a closure body located on a closure lever is disclosed in said document. By pivoting the spring-loaded closure lever, the pouring opening is uncovered in a simple manner and the beverage which is held in the vessel of the beverage container can be poured.

It is disadvantageous in the case of the above-mentioned container closure having a closure lever that a pressure has to be applied continuously to the closure lever during the pouring of the beverage in order to hold said closure lever in the opening position counter to the spring force. This is particularly inconvenient when pouring continues for a comparatively long time. By way of example, this is the case when the beverage located in the container is provided for a multiplicity of people who have to be served immediately after one another, such as is often the case in hospitality establishments or in the catering service for airline passengers.

In documents US 2004/0108336 and DE 295 04 343, container closures are in each case disclosed in which the closure lever can be blocked in its opening position. In US 2004/0108336, a sliding element is provided on the closure lever for this purpose, said sliding element pressing the closure lever, in the opening position, upward counter to a downwardly directed spring force by means of a stop. In the case of DE 295 04 343, a spring lever locks the closure lever in the opening position. In order to return the closure lever back to the closing position, a release lever is activated which pushes the spring lever away from the closure lever.

These two container closures described, in which the closure lever is blockable in its opening position, are manufactured in a relatively elaborate manner, since in each case additional components are required for providing the blocking function.

DESCRIPTION OF THE INVENTION

It is therefore an object of the present invention to provide a container closure (lid) which is as simple as possible to manufacture and in which a closure lever is blockable in its opening position in a simplest possible manner.

Indications of location and direction, such as up, down, upward, vertical etc. relate in each case to a beverage container standing upright having a vessel in which a beverage is held and which is closed by a container closure according to its intended use. The vessel usually has a substantially cylindrical shape, or has at least a substantially round cross section, and further has an upper, usually round vessel opening. The container closure is usually adapted to the vessel opening and thus also usually has a round basic shape which defines a radial direction, a circumferential direction, and a longitudinal axis which is perpendicular to said circumferential direction. The vertical direction then usually extends in the direction of gravity. One direction extends transversely to another direction when the angle formed in between is at least 45°, preferably when the directions are even substantially perpendicular to one another.

The present invention thus provides a container closure for closing a vessel having a vessel interior, in particular for the fluid-tight closing of said vessel, having:
a pouring opening which serves to form a fluid communication from the vessel interior to the outside for pouring liquid from the vessel;
a closure body by means of which the pouring opening is closable; and
a closure lever which interacts with the closure body, said closure lever having an operating region which is operable by pressure of a finger of the user in a direction of operation in order to pivot the closure lever from a closing position, in which the closure body closes the pouring opening, to an opening position, in which the closure body uncovers the pouring opening.

The container closure moreover has a rotating element which is rotatable in relation to the closure lever about an axis which extends in approximately the same direction as the direction of operation, in order to form a stop with the closure lever in a blocking position and thus to block the closure lever in its opening position, and, in a releasing position, to permit pivoting of the closure lever between the closing position and the opening position.

In a container closure of such a type, the user thus operates a closure lever in order to open the pouring opening and to pour the beverage held in the vessel. In order to block the closure lever in the opening position, the rotating element is rotated into the blocking position, in which it forms a stop with the closure lever in order to block said closure lever. The blocking in this case refers to the fact that the closure lever cannot be moved into the closure position any more. In order to pour a beverage, the user can hold the beverage container with one hand on a preferably provided hand grip, move the closure lever with, for example, the thumb of the same hand into the opening position and rotate the rotating element with the other hand in order to block the closure lever and to subsequently pour the beverage.

The operation of such a container closure is thus simple and intuitive. Moreover, a container closure formed in such a manner allows simple manufacturing from as few individual components as possible.

Preferably, the container closure as a whole represents a stand-alone element which serves to close a vessel which is formed separately from said container closure. The container closure in this case is preferably insertable into an upper vessel opening of the vessel. In alternative embodiments, the container closure may, however, also be formed as one unit or at least even be in part formed integrally with the vessel. By way of example, the pouring opening may be defined by the actual vessel.

The closure lever may interact with the closure body in any desired manner. The closure body may in particular and preferably be mounted directly on the closure lever.

The operating region of the closure lever may be operable in principle in any desired direction of operation; it is, however, preferably operable substantially in the vertical direction (in the sense of the above-defined directional notes). The operating region is in particular preferably operable in such a manner that it has to be pressed downward to open the pouring opening. The closure lever is then easily retainable in its opening position, for example, with the thumb while the beverage is being poured, when the rotating element is not in the blocking position. In the blocking position, the rotating element of a closure having a closure lever which is operable in such a manner forms an upward stop (i.e. in the direction counter to the direction of operation), and therefore preferably has a stop element which protrudes downward (i.e. in the direction of operation). The rotating element advantageously forms the stop with the operating region of the closure lever or with a region of the closure lever which is located immediately adjacent to the operating region. The blocked state of the closure lever in the opening position is then particularly clearly visible to the user.

The closure lever is advantageously spring loaded in the direction of its closing position. In the releasing position of the rotating element, the pouring opening is automatically closed when the closure lever is not operated by the user. A compression spring is preferably used for this purpose.

In a particularly preferred embodiment, the container closure has a retaining structure which is attached to a region of the container closure in relation to which the rotatable element is rotatable between the blocking position and the releasing position. In this embodiment, the rotatable element has an engaging structure which, in the blocking position, interacts with the retaining structure in such a manner that a movement of the rotatable element counter to the direction of operation in relation to said region is prevented. The retaining structure and the engaging structure thus prevent, particularly in the case of a spring-loaded closure lever, said closure lever from pushing away the rotating element in the direction of operation, as a result of its spring force, in the blocking position. Removal of the rotating element from the closure for example for cleaning purposes is, however, still readily possible by placing the rotating element in the releasing position.

The retaining structure and the engaging structure preferably form a rotating limit stop in the blocking position. An excessive rotation of the rotating element beyond the provided blocking position is prevented as a result. The retaining structure and/or the engaging structure may, in particular, be L-shaped for this purpose. One arm of such an L-shaped retaining structure or engaging structure in this case preferably extends in the circumferential direction and forms a guide for the engaging or retaining structure when the rotating element is rotated into the blocking position. In the blocking position, this arm extending in the circumferential direction serves to hold back the rotating element with respect to a movement in the direction counter to the direction of operation. The other arm preferably extends in the direction of operation and forms a stop for the engaging or retaining structure in the circumferential direction. The engaging structure and the retaining structure may moreover also be formed to enter into a bayonet connection with one another in the blocking position.

In a preferred embodiment, the container closure has a cover wall, inside of which the pouring opening is located. The cover wall is formed to at least partially cover the vessel toward the top in order, jointly with the vessel, to delimit the vessel interior. The cover wall particularly preferably even completely covers the vessel toward the top, with the exception of the pouring opening. The cover wall preferably extends substantially in a horizontal plane.

The closure lever is preferably mounted above the cover wall. It is advantageously located below the rotating element in this case, that is to say between the rotating element and the cover wall. It may, in this case, be pivotable in principle about any desired axis; however, it is preferably pivotably mounted about a horizontal axis.

In a particularly preferred embodiment, the container closure comprises a lower part which forms the cover wall, and an upper part which is formed separately from said lower part and which at least partially, but advantageously entirely, covers the lower part and the closure lever, said upper part being rotatable in relation to the lower part and forming the rotatable element. Preferably, the upper part and lower part are rotatably connected to one another in a central region.

In the event of a retaining structure being provided, said retaining structure is preferably located on the outside of the lower part. The retaining structure, if provided, is preferably located on a surface of the upper part which faces radially inward.

The upper part preferably has a downwardly extending link which in the blocking position forms a stop with the closure lever. If a retaining structure is provided, said retaining structure is preferably located on the link and particularly preferably in a lower region of the link.

The lower part preferably has a radial periphery, and the link is located outside of said radial periphery in the radial direction. The lower part advantageously also has an encircling side wall which extends upward from the cover wall, said side wall forming the radial periphery. A recess for the closure lever may be provided in the encircling side wall. Moreover, a spout is advantageously formed in this side wall.

Furthermore, the present invention provides a beverage container having such a container closure. The beverage container moreover has a vessel with a vessel bottom and an encircling side wall.

The beverage container is preferably a beverage maker having a filter piston which is vertically movable in the vessel and which has a piston rod which penetrates through the container closure. The piston rod preferably also penetrates through the closure lever in this case.

In the event of the container closure having a retaining structure, said retaining structure may in particular also be located on the vessel or on a vessel holder in which the vessel is held.

BRIEF DESCRIPTION OF THE DRAWINGS

Preferred embodiments of the invention are described in the following with reference to the drawings which are purely explanatory and not intended to be interpreted as limiting. In the drawings.

DESCRIPTION OF PREFERRED EMBODIMENTS

Figure 1:
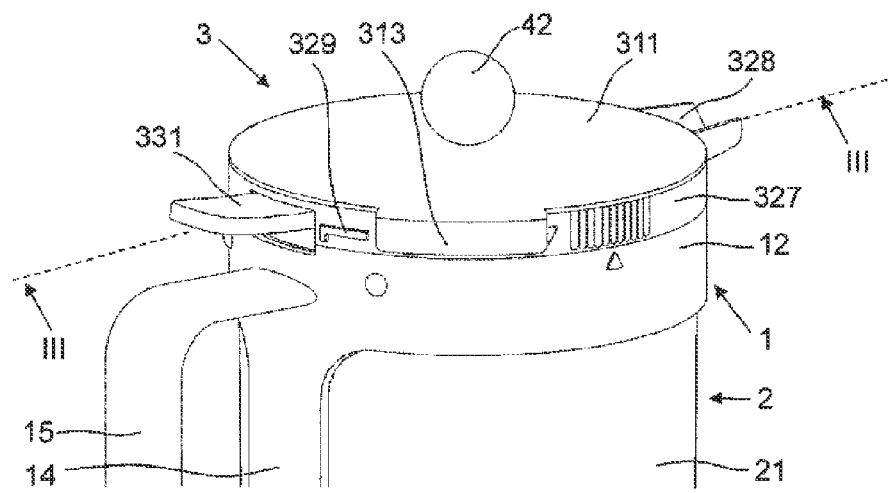
FIG. 1 shows a perspective partial view of a beverage container according to an embodiment according to the invention, the closure lever being in the closing position.

In FIGS. 1 to 5, a preferred exemplary embodiment of a lid 3 according to the invention is shown in different illustrations. In this exemplary embodiment, the lid 3 forms, together with the vessel 2 into which said lid 3 is inserted and which is closable by the lid 3, a beverage container in the form of a coffee plunger. The embodiment shown in FIGS. 1 to 5 represents a further development of the beverage container from document WO 2009/149568, the disclosure content of which is herewith expressly incorporated by way of reference into the present description.

The beverage maker comprises a holder 1 made of plastic, a substantially cylindrical vessel 2 which is held therein, a lid 3 and a filter piston 4. The vessel may be transparent and consists in particular of heat-resistant glass; it may, however, also consist of, for example, plastic or metal.

The holder 1 comprises an upper retaining ring 12, which encircles the side wall 21 of the vessel 2, and a lower retaining ring, not visible in the figures, which merges into a bottom which is downwardly perforated by a circular central opening. The retaining rings are connected to one another by two longitudinal braces 13 and 14 which extend in the longitudinal direction of the vessel. A hand grip 15 for holding the beverage maker is also connected to the upper retaining ring 12 and the lower retaining ring 15.

The upwardly open vessel 2 consists of a bottom, which may be slightly arched upward, and an encircling side wall 21 having a circular cylindrical basic shape. As opposed to most of the coffee makers according to the prior art, no spout is formed in the side wall. The side wall 21 terminates just below the upper rim of the upper retaining ring 12 of the holder 1.

Figure 3:
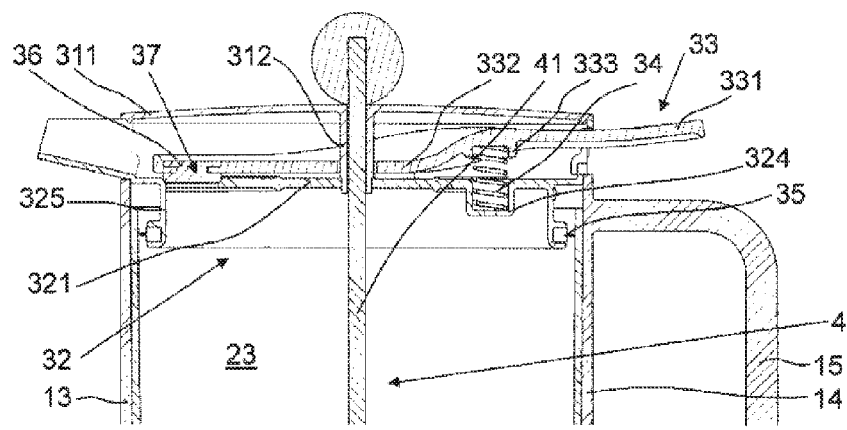
FIG. 3 shows a partial view of a central section through the beverage container of FIG. 1, the closure lever being in the closing position.

The container closure or lid 3 is inserted into the vessel 2. Said lid 3 is of two-piece design and comprises a lid lower part 32 and a lid upper part 31. The lid lower part 32 has a substantially planar cover wall 321 which extensively covers the upper vessel opening and, together with the vessel 2, delimits a vessel interior 23. A pouring opening 37 is formed in the cover wall 321, said pouring opening 37 being visible in FIGS. 3 and 4. In FIG. 3, the pouring opening 37 is closed in a sealed manner by a closure body 36 in the form of a stopper.

Starting from the cover wall 321, a cylindrical side wall 327, which is interrupted by a beak-like spout 328 and by a cutout for a closure lever 33, extends upward from the outer rim of said cover wall 321. Also starting from the cover wall 321, an encircling, cylindrical skirt 325 having a slightly smaller diameter extends downward into the vessel 2. From the skirt, a pair of annular, spaced-apart webs extend outward and form a mounting for an encircling, annular seal 35 having a radially outwardly protruding seal lip. Thus, on the one hand, the lid 3 is held relatively tightly in the vessel 2 after having been inserted, and, on the other hand, a seal between the vessel and the lid is formed which prevents liquid leaking between vessel and lid.

The closure lever 33 of elongate shape is pivotably mounted on the lid lower part 32. For this purpose, said closure lever 33 has two laterally protruding, coaxial, horizontal bearings pins, not shown in the drawings, on a central main section 332, said bearing pins being clicked into two mouth-shaped bearing elements which are open toward the front, i.e. in the direction of the spout 328, said bearing elements also not being visible in the drawings.

In the forward end region of the closure lever 33 which faces the spout 328, a round opening is formed, into which the closure body 36 is inserted. Whilst the actual closure lever 33, like the rest of the lid, is made of an impact-resistant and relatively hard plastic, such as, for example, polypropylene, the closure body 36 is made from a comparatively soft material, for example silicone plastic, in order to achieve a good sealing effect.

Figure 2:
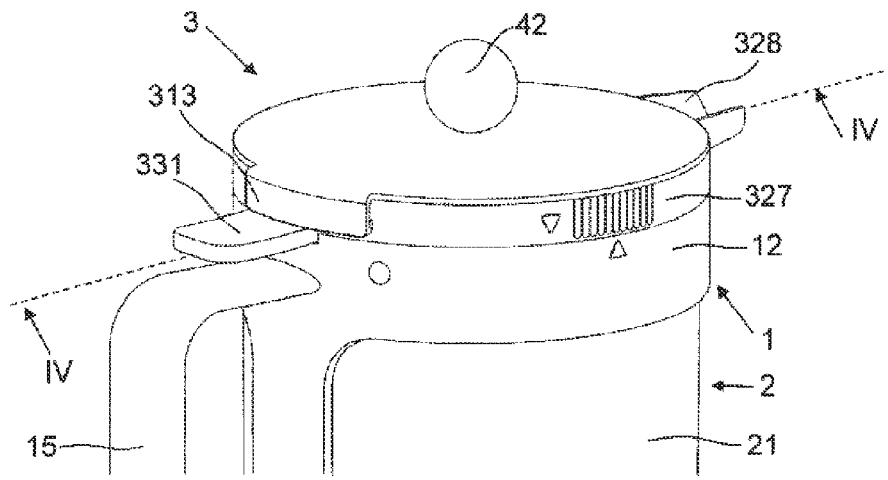
FIG. 2 shows a perspective partial view of the beverage container of FIG. 1, the closure lever being in the blocked opening position.
Figure 4:
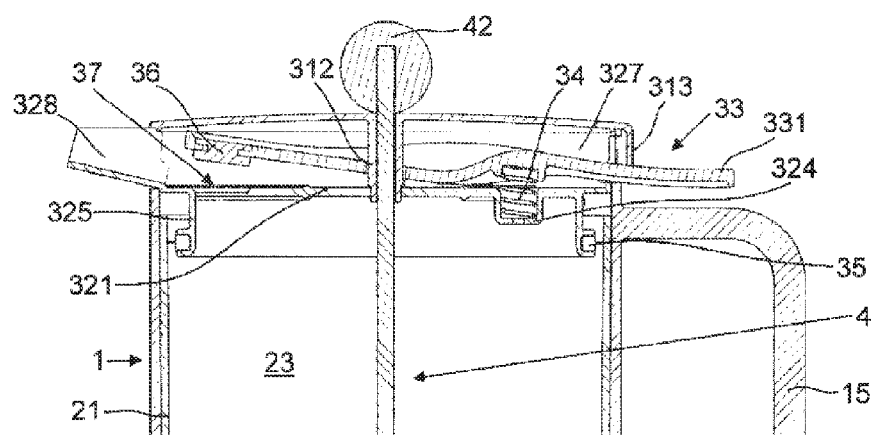
FIG. 4 shows a partial view of a central section through the beverage container of FIG. 1, the closure lever being in the blocked opening position.

At the rear end of the closure lever 33 which faces away from the spout, said closure lever 33 protrudes radially out of the lid lower part 32 with an operating region 331 and can be easily pivoted about its horizontal pivot axis by being pressed downward (i.e. in a direction of operation) by the thumb of the user, such that the closure body 36 is lifted from the pouring opening 37 and reveals the pouring opening. The closure lever 33 is thus in an opening position as shown in FIGS. 2 and 4.

By means of a coil spring 34 which acts by compression, the lever is pre-tensioned toward the closing position. The coil spring 34 is located in the rear region of the lever which faces away from the spout, but is still located within the side wall 327 of the lid lower part. The spring is held in a pot-shaped depression 324 of the cover wall 321, this enabling a spring travel which is greater than would be possible without such a depression. In the upward direction, the spring engages in an annular spring seat 333 on the underside of the closure lever 33. On account of the depression 324 and the spring seat 333, the spring is secured against lateral displacement or even jumping out. In the closing position of the closure lever 33 shown in FIGS. 1 and 3, the closure body 36 thus closes the pouring opening 37 in particular as a result of the spring pressure which is exerted by the coil spring 34 on the closure lever 33.

Figure 5:
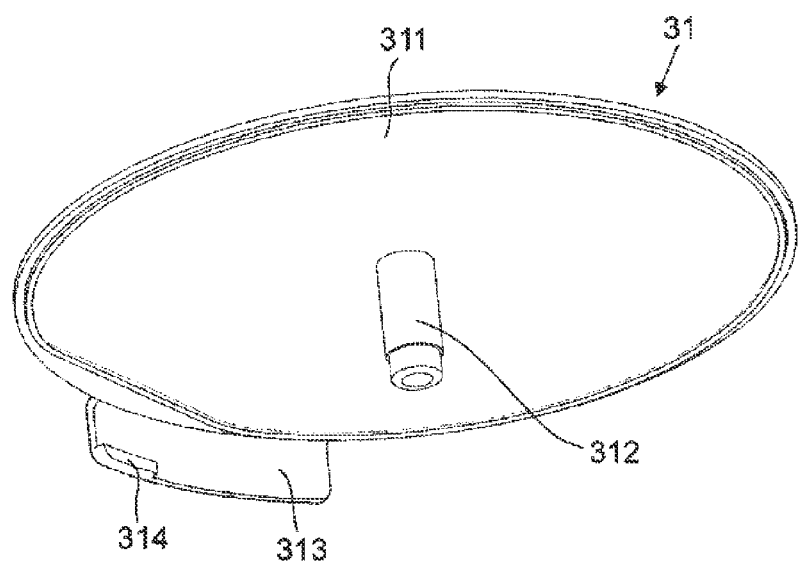
FIG. 5 shows a perspective view obliquely from below of the lid upper part of the beverage container of FIG. 1.

The lid upper part 31, which is shown in particular in FIG. 5, covers with its upper cover wall 311 the upper rim of the side wall 327 of the lid lower part 32. Starting from a central opening of the upper cover wall, a guide bush 312, which is integrally formed in the upper cover wall, extends vertically downward, the piston rod 41 of the filter piston 4 being guided in said guide bush. The closure lever 33 and the lower cover wall 321 of the lid lower part 32 each have a clearance opening through which the guide bush 312 extends. In this case, the clearance opening of the closure lever 33 is sufficiently large not to compromise the pivoting movement of the lever. The clearance opening of the lower cover wall 321, however, is a custom fit for the guide bush 312. In the region of the lower end of the guide bush, a plurality of flat, spherical-segment-shaped latching pins are formed on the surface of the guide bush (not visible in the drawings) which form a detachable latching connection between guide bush 312 and lid lower part 32 after the guide bush has been inserted. In this way, the guide bush is secured at two different vertical locations against lateral displacements and thus against tilting movements. This not only improves the vertical guidance of the piston rod 41 but also diminishes the risk of the connection between the upper cover wall 311 and the guide bush 312 breaking. The cover upper part 31 and the cover lower part 32 are thus particularly connected to one another in such a manner that they are rotatable in relation to one another about the vertical axis.

A link 313 extends downward from the outer rim of the cover wall 311 of the lid upper part 31. In the circumferential direction, the link 313 is configured to be somewhat longer in comparison with the width of the closure lever 33 in the region of its operating region 331. In alternative embodiments, however, the link could be configured to be substantially longer and extend over almost the entire circumference of the cover wall 311. In the vertical direction, the link 313 is configured to be approximately as long as the height of the side wall 327 of the lid lower part 32. As is shown in FIGS. 1 and 2, the link 313 is located in the radial direction on the outer side of the side wall 327 which forms a radial periphery of the lid lower part 32. The position of the link 313 in the circumferential direction in relation to the lid lower part 32 and particularly to the closure lever 33 is thus readily identifiable at any time by the user.

The lid upper part 31 having the link 313 is rotatable in relation to the lid lower part 32 and the closure lever 33 attached thereto in such a manner that it has a blocking position, as shown in FIGS. 2 and 4, which blocks the closure lever 33 in its opening position. The link 313 here forms an upper stop for the closure lever 33 in the immediate vicinity of the operating region 331, thus preventing pivoting of the closure lever 33 back into its closing position. As a result, the user can comfortably pour the beverage contained in the vessel 2 without having to exert any pressure on the operating region 331 of the closure lever 33. By turning back the lid upper part 31 into the releasing position shown in FIGS. 1 and 3, pivoting of the closure lever 33 back into the closure position is enabled again.

Starting from that vertical edge of the link 313 which, in the releasing position shown in FIG. 1, faces away in the circumferential direction from the operating region 331 of the closure lever 33 and toward the spout 328, an engaging structure 314 extends along the lower edge of the link 313. In comparison to the link 313, however, the engaging structure 314 extends across a substantially smaller angular region. The engaging structure 314 located on the radial inner side of the link 313 is configured to engage with a retaining structure 329 in the blocking position of the lid upper part 31, said retaining structure 329 being located on the radial outer side of the side wall 327 of the lid lower part 32 in a region next to the cutout for the closure lever 33. This engagement has the effect that the lid upper part 31 is not pushed away upward in the vertical direction in the blocking position as a result of the spring force of the compression spring 34. The engaging structure 314 and the retaining structure 329 thus secure the lid upper part 31 in the blocking position on the lid lower part 32.

As in the present exemplary embodiment, the retaining structure 329 may be configured in an L-shape and form a stop for the engaging structure 314 in the circumferential direction. In this way, excessive rotation of the lid upper part 31 beyond the blocking position is prevented. The edge of the engaging structure 314 which faces in the circumferential direction toward the retaining structure 329 may also be formed in a sloped manner in order to prevent unintentional latching between the retaining structure 329 and the engaging structure 314 when the lid upper part 31 is rotated in the direction of the blocking position. Alternatively, the retaining structure 329 and the engaging structure 314 may also form a bayonet connection with one another in the blocking position.

The filter piston has a button 42 as an operating element at the upper end of the piston rod 41. A plunger filter not shown in the figures is located at the lower end of the piston rod, said plunger filter being of any desired, already known design. In particular, such filter pistons having plunger filters are often seen in beverage makers known as "French presses" and many different configurations thereof have therefore been known for a long time.

The invention is, of course, not limited to the aforementioned example, and a multiplicity of modifications are possible. Thus, the closure lever, in particular, may be configured differently in terms of its shape and arrangement. By way of example, the operating region need not be located radially outside of the lid lower part, but may also lie within the lid lower part and be accessible from above through a cutout or opening in the lid upper part. Instead of a link located on the outer rim, the lid upper part may then, for example, have a downwardly protruding element which is located within the side wall of the lid lower part, said element forming, in the blocking position, a stop with the closure lever. In place of the vessel holder illustrated in the drawings, any desired other holder may be used, or the holder may also be entirely dispensed with, for example when the vessel has an integral holding grip. Despite this not being preferred, at least one part of the container closure could also be integrally formed with the vessel or the vessel holder. For example, the lid lower part of the embodiment shown in FIGS. 1 to 5 could be integrally formed with the vessel or the vessel holder. A multiplicity of further modifications is possible. In particular, it goes without saying that the mechanism of the closure lever for closing and opening the pouring opening could be configured entirely differently and be independent of the blocking function of the lid upper part in relation to the opening position of the closure lever. Thus, for example, it is not mandatory for the closure body to be located on the closure lever. The closure lever could, for example, also interact indirectly with the closure body, as is the case, for example, with the beverage containers described in the documents US 2004/0108336 and DE 295 04 343. The pouring opening could also be formed in the region of the side wall of the lid lower part, and the closure lever could be pivotable about a vertical axis and accordingly be operable in the circumferential direction instead of in the vertical direction. The rotating element would then, together with the closure lever, form a stop in the circumferential direction to block said closure lever in the opening position. Of course, the filter piston may be dispensed with.

LIST OF REFERENCE SIGNS

1 Holder
12 Upper ring
13, 14 Longitudinal brace
15 Holding grip
2 Glass vessel
21 Side wall
23 Interior
3 Lid
31 Lid upper part
311 Cover wall
312 Guide bush
313 Link
314 Engaging structure
32 Lid lower part
321 Cover wall
324 Depression
325 Skirt
327 Side wall
328 Spout
329 Retaining structure
33 Closure lever
331 Operating region
332 Main section
333 Spring seat
34 Compression spring
35 Seal ring
36 Closure body
37 Pouring opening
4 Filter piston
41 Piston rod
42 Operating button

The invention claimed is:

1. A container closure for closing a vessel with a vessel interior, having
 a pouring opening which serves to form a fluid communication from the vessel interior to the outside for pouring liquid from the vessel;
 a closure body by means of which the pouring opening is closable; and
 a closure lever which interacts with the closure body, said closure lever having an operating region which is operable by pressure of a finger of the user in a direction of operation in order to pivot the closure lever from a closing position, in which the closure body closes the pouring opening, to an opening position, in which the closure body uncovers the pouring opening,
 wherein
 the container closure also has a rotating element which is rotatable in relation to the closure lever about an axis which extends in approximately the same direction as the direction of operation, in order to form a stop with the closure lever in a blocking position and thus to block the closure lever in its opening position, and, in a releasing position, to permit pivoting of the closure lever between the closing position and the opening position.

2. The container closure as claimed in claim 1, wherein the direction of operation of the closure lever corresponds substantially to a vertical direction, and wherein the rotating element forms a stop in the upward direction for the closure lever.

3. The container closure as claimed in claim 1, wherein the closure lever is spring loaded in the direction of its closing position.

4. The container closure as claimed in claim 1, wherein the container closure has a region, in relation to which the rotatable element is rotatable between the blocking position and the releasing position, and to which a retaining structure is attached, and wherein the rotatable element has an engaging structure which, in the blocking position, interacts with the retaining structure in such a manner that a movement of the rotatable element counter to the direction of operation in relation to said region is prevented.

5. The container closure as claimed in claim 4, wherein the retaining structure and the engaging structure form a rotating limit stop in the blocking position.

6. The container closure as claimed in claim 1, having a cover wall, inside of which the pouring opening is located, and which is formed to at least partially cover the vessel toward the top in order, jointly with the vessel, to delimit the vessel interior.

7. The container closure as claimed in claim 6, wherein the closure lever is pivotably mounted about a horizontal axis above the cover wall.

8. The container closure as claimed in claim 6, wherein the container closure comprises a lower part which forms the cover wall, and wherein the container closure comprises an upper part which is formed separately from said lower part and which at least partially covers the lower part and the closure lever, said upper part being rotatable in relation to the lower part and forming the rotatable element.

9. The container closure as claimed in claim 8, wherein the upper part has a downwardly extending link which in the blocking position forms a stop with the closure lever.

10. The container closure as claimed in claim 9, wherein the lower part has a radial periphery and wherein the link is located outside of said radial periphery in the radial direction.

11. The container closure as claimed in claim 10, wherein the lower part has an encircling side wall which extends upward from the cover wall, said side wall forming the radial periphery.

12. A beverage container having a vessel with a vessel interior, a vessel bottom and an encircling side wall, and a container closure for closing the vessel, the container closure having
 a pouring opening which serves to form a fluid communication from the vessel interior to the outside for pouring liquid from the vessel;
 a closure body by means of which the pouring opening is closable; and
 a closure lever which interacts with the closure body, said closure lever having an operating region which is operable by pressure of a finger of the user in a direction of operation in order to pivot the closure lever from a closing position, in which the closure body closes the pouring opening, to an opening position, in which the closure body uncovers the pouring opening,
 wherein
 the container closure also has a rotating element which is rotatable in relation to the closure lever about an axis which extends in approximately the same direction as the direction of operation, in order to form a stop with the closure lever in a blocking position and thus to block the closure lever in its opening position, and, in a releasing position, to permit pivoting of the closure lever between the closing position and the opening position.

13. The beverage container as claimed in claim 12, wherein the beverage container is a beverage maker having a filter piston which is vertically movable in the vessel and which has a piston rod which penetrates through the container closure.

14. The beverage container as claimed in claim 12, wherein the vessel, or a vessel holder in which the vessel is held, has a retaining structure, and wherein the rotatable element has an engaging structure which, in the blocking position, interacts with the retaining structure in such a manner that a movement of the rotatable element in the direction counter to the direction of operation in relation to the vessel or the vessel holder is prevented.

* * * * *